(No Model.)
P. M. HARDY & T. R. BOYD.
CULTIVATOR.
No. 460,471. Patented Sept. 29, 1891.
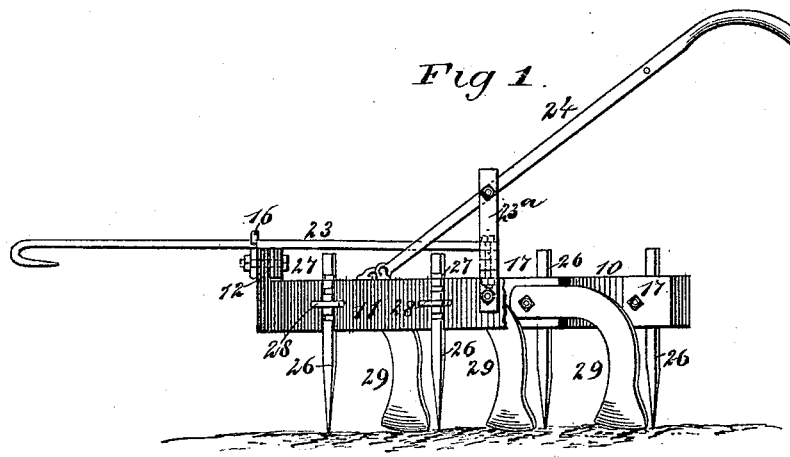
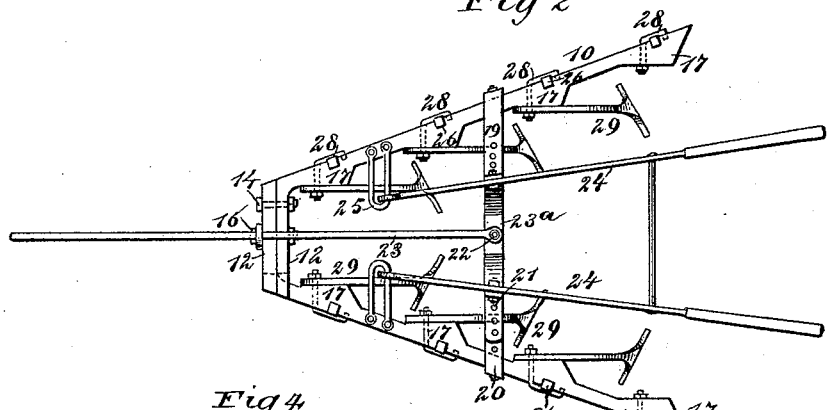
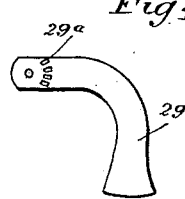
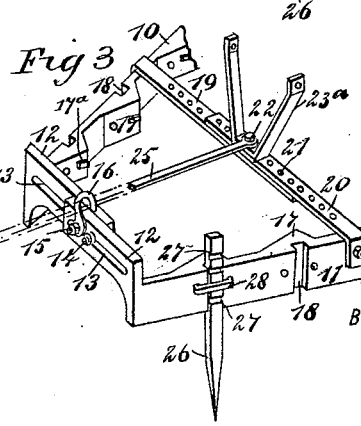
WITNESSES:
Paul Johst
C. Sedgwick
INVENTORS:
P. M. Hardy
T. R. Boyd
BY Munn & Co.
ATTORNEY.

UNITED STATES PATENT OFFICE.

PARROTT M. HARDY AND THOMAS R. BOYD, OF EDWARDS' MILL, NORTH CAROLINA.

CULTIVATOR.

SPECIFICATION forming part of Letters Patent No. 460,471, dated September 29, 1891.

Application filed July 6, 1891. Serial No. 398,481. (No model.)

*To all whom it may concern:*

Be it known that we, PARROTT M. HARDY and THOMAS R. BOYD, of Edwards' Mill, in the county of Beaufort and State of North Carolina, have invented a new and useful Improvement in Cultivators, of which the following is a full, clear, and exact description.

Our invention relates to an improvement in cultivators, and has for its object to provide an implement of simple, durable, and economic construction, and to provide a means whereby the implement may be adjusted laterally to work upon rows of different widths, and wherein, also, harrow-teeth and cultivator-blades carried by the implement may be expeditiously and conveniently adjusted vertically to and from the ground.

Another object of the invention is to so construct the frame that the shanks of the cultivator-blades will be given an inclination therefrom in the direction of the center of the implement and the offsets producing such inclination and admit of the sockets being produced therein for the reception of harrow-teeth.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the implement, one member of the frame being broken away. Fig. 2 is a plan view. Fig. 3 is a perspective view of the forward end of the implement, and Fig. 4 is a detail side elevation of one of the cultivator-blades and its shank.

The frame comprises, essentially, two side bars 10 and 11, each of which side bars at its forward end is provided with an attached or integral head-bar 12, the side bars being located at an angle less than a right angle with respect to their head-bars, whereby when the head-bars 12 of both side bars are brought in engagement the side bars will extend rearward in opposite directions, imparting to the frame somewhat of the shape of the letter V. Each head-bar 12 is provided with a longitudinal slot 13, and the head-bars are connected by means of a suitable bolt 14, provided with a nut, or by the equivalent of a bolt. A second bolt 15 passes through the slots of the head-bars of the frame, and while serving to connect said bars also serves as a support for a hook 16, adapted to extend vertically above the upper edge of the bars, as shown in Figs. 1 and 3. The side bars have formed upon their inner faces a series of offsets or lugs 17, and the inner faces of said offsets or lugs are inclined, the inclination being from the front inward in the direction of the rear of the implement, and upon the inclined face of each lug a stud $17^a$ is formed. The offsets 17 upon the side bars are practically in transverse alignment, and in the outer face of each side bar, immediately opposite each offset 17, a vertical slot 18 is produced. The side bars are connected at or near their centers by two cross-bars 19 and 20, one cross-bar being secured to each side bar, and the inner ends of the cross-bars are held to slide one upon the other, being provided with a number of apertures 21, whereby the side bars may be braced and held in any desired position through the medium of a bolt 22 or its equivalent passed through aligning apertures in the cross-bars.

A draft-bar 23 is employed in connection with the implement, preferably terminating at its outer end in a hook for the reception of single or double trees, and the inner end of the draft-bar, secured to the cross-bars by the bolt 22, has likewise, ordinarily, an essentially V-shaped vertically-disposed brace $23^a$, the said brace being adapted for attachment to the handles 24, the inner ends of which handles are ordinarily passed downward through staples 25, projected from the side bars of the frame.

The shanks of the harrow-teeth 26, the latter being of any approved construction, are located in the vertical recesses 18 of the frame. The shanks are usually provided with a series of transverse grooves or channels 27 in their outer faces, adapted to receive the bow-sections of clips 28, one clip being employed for each tooth. These clips, as shown in Fig. 2, are preferably made with one short and one long leg, the short legs being entered in apertures located at one side of each vertical recess 18, and the long legs are passed through other apertures at the opposite sides of the recesses and through the offsets immediately back of the recesses, the clips being secured in position by suitable nuts placed upon their longer legs. It will be observed that the teeth may be adjusted vertically either upward or downward by loosening the clips and causing them to enter the most convenient of the grooves 27.

The cultivator-blades 29 comprise an essentially angular shank and a lower cutting-surface integral with or secured to the lower end of the vertical member of the blade, the said cutting-surface being at an angle to the horizontal member. The horizontal members of the blades are placed in engagement with the inclined faces of the offsets 17, whereby the blades are given a slant rearward and inward, as best shown in Fig. 2, and the attachment of the blades to the offsets is effected by passing the longer legs of the clips 28 through suitable apertures in the forward ends of the blades, or what might properly be called the "shanks" of the blades. The horizontal members of the shanks of the cultivator-blades are provided with a group of semicircularly-arranged grooves $29^a$, adapted to receive the studs $17^a$ upon the frame. Thus the blades may be adjusted upward or downward by loosening the clips, placing the blades in the desired position, and then again tightening the clips, whereupon the studs $17^a$, being entered into one of the grooves in the shanks of the blades, will assist in maintaining the latter in the desired position.

As heretofore stated, an implement constructed in this manner may be entirely of metal and may be made exceedingly light, as the offsets 17 not only give proper inclination to the cultivator-blades, but also serve to re-enforce the side bars at those points in which the sockets are to be produced for the cultivator-teeth.

Having thus described our invention, we claim as new and desire to secure by Letters Patent—

1. In an implement of the character described, the combination, with a frame provided with a series of offsets having inclined faces and recesses or sockets opposite said offsets, of cultivator-blades secured to the inclined faces of the offsets, cultivator-teeth located in the recesses or sockets, and a fastening device, substantially as shown and described, for securing the cultivator-teeth and blades adjustably to the frame, as and for the purpose set forth.

2. In a cultivator, the combination, with the frame thereof and offsets produced upon one side of the frame, having inclined faces, the said frame being also provided in its offset face with recesses or sockets, of cultivator-teeth located in the recesses or sockets, cultivator-blades in engagement with the inclined faces of the offsets, and clips securing the teeth and the blades in adjustable position, as and for the purpose set forth.

3. In an implement of the character described, the combination, with an essentially V-shaped frame, the side bars of which are adjustable to and from each other, said side bars having produced in their outer faces sockets or recesses and having formed upon their inner faces, opposite said sockets or recesses, offsets having rearwardly-inclined faces, of harrow-teeth located in the sockets or recesses, blades engaging with the inclined faces of the offsets, and locking devices, substantially as described, securing the blades and teeth adjustably to the frame, as and for the purpose set forth.

PARROTT M. HARDY.
THOMAS R. BOYD.

Witnesses:
J. B. PARSONS,
S. J. YOUNG.